May 14, 1940.　　W. B. BOHANNON　　2,200,819
MEASURING SYSTEM
Filed Oct. 31, 1936　　2 Sheets-Sheet 1

APPARATUS OF KNOWN
VARIABLE ELECTRICAL
CHARACTERISTIC

GRID BIASING
RESISTANCE

INVENTOR
W. B. BOHANNON
BY
ATTORNEY

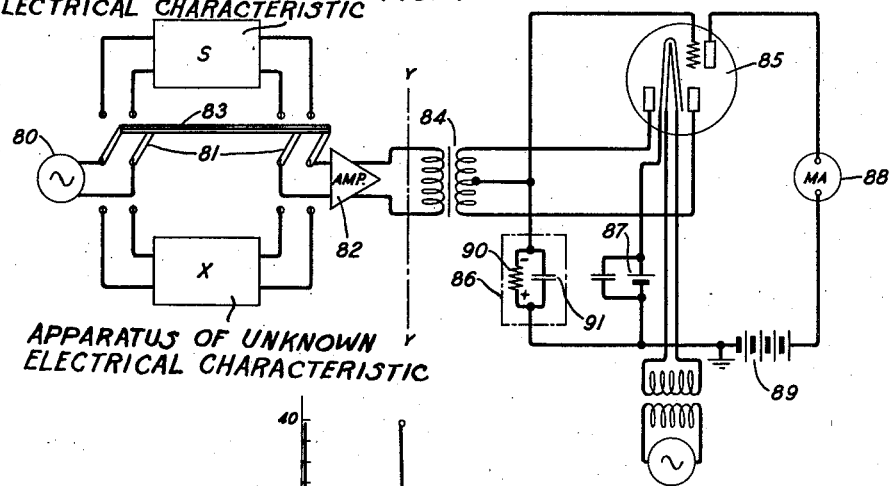
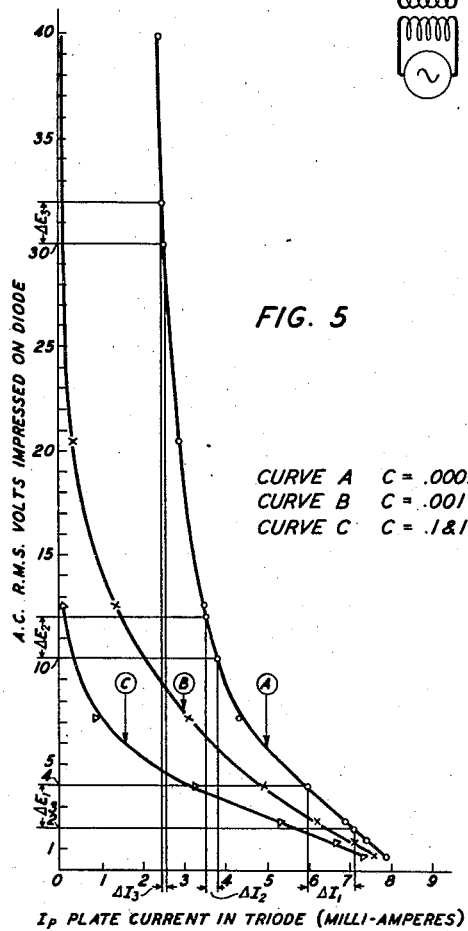

Patented May 14, 1940

2,200,819

UNITED STATES PATENT OFFICE 2,200,819

MEASURING SYSTEM

William B. Bohannon, Westfield, N. J., assignor to Western Electric Company, Incorporated, New York, N. Y., a corporation of New York Application October 31, 1936, Serial No. 108,586

10 Claims. (Cl. 171—95)

This invention relates to electrical testing systems, and more particularly to systems for measuring electrical quantities.

It is an object of this invention to provide a facile arrangement for measuring vanishing electrical quantities.

It is another object of this invention to provide a system manifesting increasing sensitivity as the measured quantities approach zero.

It is a further object of this invention to provide a system in which measurements are restricted to changes in voltage above a predetermined level.

Testing systems employing multi-arm networks for measuring vanishing alternating currents are known in various arrangements. These rely on a uniform response over the entire range of measurement. As a result the apparatus is exposed to the danger of damage due to overloading when the currents are relatively large. The present invention embodying a varying response over the entire range of measurement obviates the danger of overloading by becoming increasingly insensitive as the currents increase. Accordingly, this invention comprises, in a specific form, a multi-arm network coupled to a measuring circuit that includes an amplifier, a rectifier and a visual indicator. Unbalance currents are rectified to develop direct current potential differences which control the output of the amplifier and thereby the visual indicator. The measuring circuit is so arranged that the visual-indicator responses are largest as the currents to be measured approach a predetermined value and smallest as the currents to be measured increase relative to the predetermined value.

The invention will be more readily understood from the following description taken together with the accompanying drawings in which:

Figs. 2, 3 and 4 show modifications of Fig. 1; and

Fig. 5 is a graphic representation of the operation of Fig. 1.

Figure 1:
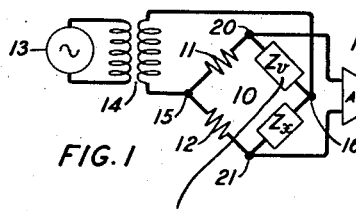
Fig. 1 is a diagrammatic circuit illustrating the preferred form of the invention.

Operation of Fig. 1

In Fig. 1, a multi-arm network 10 comprises impedance arms 11 and 12, a variable arm $Z_v$, and an unknown arm $Z_x$ representing an electrical apparatus whose electrical characteristics it is desired to measure. If the unknown arm $Z_x$ should entirely consist of capacity or inductance or resistance or a combination thereof, there is inserted in the variable arm $Z_v$ a variable condenser or a variable inductance or a variable resistance or a combination thereof as the case may be. An alternating-current source 13 suitable for testing purposes is coupled by transformer 14 to terminals 15 and 16 of the network.

Neutral points 20 and 21 of the network are connected to the input of a conventional amplifier 17 that has its output impressed across the primary of a step-up transformer 22 whose secondary winding is applied across the input of a multiple-function tube 23. The latter is preferably of a diode-triode type known commercially as Western Electric 292–A, and comprises a cathode 24, a control electrode 25, a plate 26, anodes 27, 27 and a heater 28. The anodes 27, 27 cooperate with the cathode 24 to form a diode rectifier while the control electrode 25 and plate 26 cooperate with the cathode 24 to form a triode amplifier-rectifier. The heater 28 is energized by a transformer 29 which is connected to a source 29 of 110 volts, alternating current. It will be noted that cathode 24 is connected to ground.

One terminal of the secondary of transformer 22 is connected by lead 33 to battery 34 which biases the control electrode 25. The opposite terminal of the secondary is connected by lead 35 to a link 36 joining the anodes 27, 27. A network 37 comprising a resistance 38 and a condenser 39 in parallel has one terminal connected to lead 33 at a point intermediate the secondary winding of transformer 22 and biasing battery 34 and its opposite terminal to cathode 24. The output circuit of the triode comprises a plate battery 40 and a milliammeter 41. It is understood that the diode is arranged for half-wave rectification.

Preparatory to measuring one of the electrical characteristics mentioned above, the circuit of Fig. 1 is initially adjusted as follows: With no input applied to transformer 22 and normal potential impressed on plate 26, biasing battery 34 is selected such that the current flowing in the output of the detector produces the maximum reading on the scale of milliammeter 41.

In operation, the multi-arm network 10 functions for the purposes above described in the well-known manner and needs no further exposition relative to its principle of operation. Accordingly, it will be understood that the adjustable arm $Z_v$ is balanced against the unknown arm $Z_x$, and further, that when a balance therebetween is reached no current will flow across points 20 and 21. Until such balance is attained, however, unbalance current will flow across these points. This current amplified in amplifier 17 causes a voltage to be induced in the secondary of transformer 22.

This induced voltage rectified by the diode causes a direct current to flow through resistance 38 whereby a direct current voltage drop is built up thereacross. It will be noticed in Fig. 1 that the end of resistance 38 nearest to the control electrode 25 of tube 23 is negative. Therefore, the drop augments the biasing voltage supplied by battery 34. As a result of the increased bias, the flow of space current in the triode is reduced. Consequently the plate current of the triode is reduced as will be indicated by the reading on milliammeter 41. The condenser 39 smooths out the voltage drop built up across resistance 38.

As the alternating current voltage induced in the secondary of transformer 22 increases, the direct current voltage drop built up across resistance 38 also increases. Thus, an increasing bias cuts down the plate current flowing in the triode. As the alternating current voltage induced in the secondary of the transformer 22 decreases, the direct current voltage drop built up across resistance 38 also decreases. Obviously, the decreasing bias increases the plate current flowing in the triode. These plate-current variations are read directly on milliammeter 41. Accordingly, it is seen that the direct current voltage drop provides a control for varying the current in the triode output.

The direct current voltage drop built up across resistance 38 is substantially directly proportional to the alternating current voltage induced in the secondary of transformer 22 irrespective of the ratio of resistance 38 to the reactance of condenser 39. When this ratio is 20 or larger, the proportion of the direct current voltage drop to alternating current voltage in the secondary of transformer 22 is substantially constant. Hence, the actual magnitude of the triode output for various values of grid voltage will correspond closely to the value of plate current predicted from the plate-current grid-voltage characteristic curve of the triode.

When the ratio of resistance 38 to the reactance of condenser 30 falls below 20, the actual magnitude of the triode output will also follow closely the values of plate current predicted from the plate-current grid-voltage characteristic curve. This is true so long as the curvature of the plate-current grid-voltage characteristic is relatively small. However, as the level of the alternating current voltage induced in the secondary of transformer 22 decreases and the value of direct current voltage drop is such as to bias the control electrode 25 to a point where the curvature of the plate-current grid-voltage characteristic is pronounced, the measured magnitude of the triode output will be greater than that predicted from the characteristic curve. Hence, the actual changes in output current will be less than expected. The unpredicted increase of the plate current would seem to be due to the action of plate rectification.

Therefore, a predetermined selection of resistance 38 and condenser 39 for a particular frequency would provide a circuit in which large changes in the high levels of an input of alternating current voltage would produce small changes in the magnitude of output current of the triode. Further, as the levels of input voltage decrease, the changes in output current become larger until a point is reached where the same changes in the low levels of input voltage produce increasingly large variations in output current.

Fig. 5 shows alternating current voltage input-output current curves for circuits having a frequency source 13 of 900 cycles per second and including a resistance 38 of 500,000 ohms bridged by a condenser 39 of indicated capacity. Referring to curve A, it is seen that an input voltage change from 32 to 30 volts produces a relatively small variation in output current. Also, in the same curve, it is shown that a voltage change from 12 to 10 volts effects a larger variation while a change from 4 to 2 volts causes a still larger variation in the output current. From curve A, it is clear that as the input voltage approaches zero the output current tends to its maximum value in increasingly large increments. Thus, the current in the output of the triode varies substantially logarithmically in response to linear changes in input voltage.

In curve A of Fig. 5, the high levels of input voltage may represent the network 10 off balance while the low levels may indicate the network 10 approaching balance. In connection with this particular use, it will be noted from the above description that at high levels of input voltage, milliammeter 41 is protected against damage due to overloading since the magnitude of output current is relatively small, and the output current becomes still smaller as the input voltage is increased.

In other words, when the network is considerably off balance, a 2-volt decrease in the input voltage is reflected as a small deflection on the scale of milliammeter 41 and further, as the network approaches balance in 2-volt steps these are reflected in increasingly larger deflections until, in the region of proximate balance, smaller decreases in input voltage are reflected as relatively larger deflections on the scale of milliammeter 41. Thus, the measuring circuit manifests its highest sensitivity during the final steps of bringing the network into balance.

It will be understood that at network balance the voltage induced in the secondary of transformer 22 will be zero since there will be no current flowing across the points 20 and 21. It follows, therefore, that there will be no voltage drop developed across resistance 38, hence the output current of the triode will attain a maximum and produce a full-scale deflection on the milliammeter 41.

Figure 2:
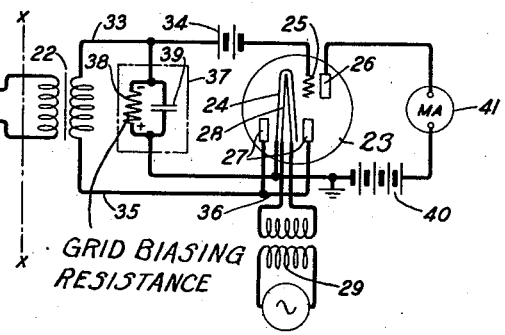
Figure 2:
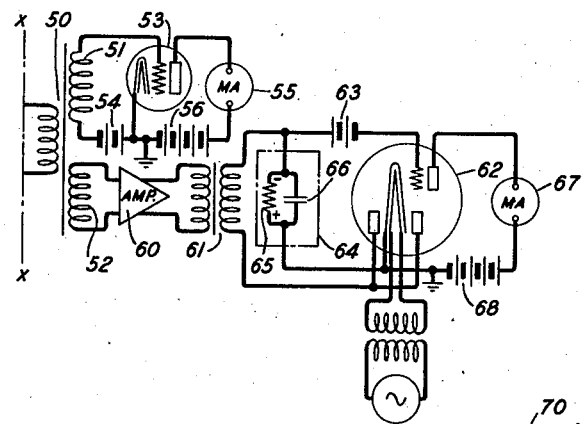

Operation of Fig. 2

In the modification shown in Fig. 2, it is to be understood that the circuit portion shown is to be substituted for the circuit portion to the right of the line $x$—$x$ in Fig. 1.

Fig. 2 also comprises a step-up transformer 50 formed with secondaries 51 and 52. Secondary 51 is bridged across the input of detector 53 which may be of a suitable commercial type such, for example, as Western Electric 262-A. Battery 54 biases the grid of detector 53. The plate of detector 53 is connected to an output circuit comprising a milliammeter 55 and a plate battery 56.

Secondary 52 is connected to the input of a suitable amplifier 60 whose output is impressed across the primary of a step-up transformer 61. One terminal of the secondary of the latter is joined to the diode rectifier of tube 62 which is of the diode-triode type and identical in structure and operation to tube 23 of Fig. 1. The opposite terminal of the secondary of transformer 61 is connected through biasing battery 63 to the grid of tube 62. A network 64 comprising a resistance 65 and a condenser 66 in parallel has one terminal joined to the grid lead of the tube 62 at a point intermediate the secondary of transformer 61 and biasing battery 63, and its opposite terminal joined to the cathode of tube 62. The output circuit of the triode of tube 62 includes a milliammeter 67 and a plate battery 68.

In balancing the multi-arm network 10 described above, the detector 53 is designed to offer a wide hunting range while the diode-triode tube 62 provides a high sensitivity in approaching balance. The operation of Fig. 2 is as follows:

The grid of detector 53 is so biased that at complete unbalance of the bridge there is produced almost a full-scale reading on milliammeter 55. Also, with no input impressed on the primary of transformer 50, the grid of tube 62 is biased so that the current flowing through milliammeter 67 produces a maximum reading thereon. In both cases, it is presupposed that normal potential is impressed on the plates of the respective tubes. In connection with the preliminary adjustment of tube 62, it is understood that the gain of amplifier 60 is set at a high level which would render tube 62 substantially ineffective during the useful range of detector 53. The gain is reset, if necessary, however, as the detector 53 approaches the limit of its useful function. This will be more adequately explained hereinafter. The testing frequency together with resistance 65 and condenser 66 may be selected for a particular test in view of the considerations set forth above relative to Fig. 1.

In operation, the multi-arm network 10 is arranged with the apparatus whose electrical characteristic it is desired to measure. When the network is considerably off balance, a relatively high level of alternating current voltage will be induced in the secondaries 51 and 52. Since the high gain of the amplifier 60 effects a high direct-current potential in the network 64, the tube 62 is rendered substantially ineffective, consequently, the reading on milliammeter 67 may be disregarded for the moment.

The voltage induced in secondary 51 will cause a current to flow in the output of detector 53 whereby an initial reading of a relatively large magnitude is produced on milliammeter 55. The action of detector 53 is well known and, accordingly, is not thought to require further explanation. As the variable arm of the network is manipulated to vary the initial reading, these readings may be utilized to determine what adjustments are required to bring the network toward balance. Thereafter, proper adjustments of the network bring about a decrease in the voltage induced in secondary 51 until a level is reached whereat the reading on milliammeter 55 and variations thereof become substantially zero.

At this point, the gain of amplifier 60 is such as to render tube 62 effective during the final steps of balancing. The gain should be sufficient to produce a reading on milliammeter 67 and, if necessary, is adjusted to accomplish this. The voltage induced in secondary 52 is rectified in the diode of tube 62. Thus, a direct current flow is established through resistance 65 to build up a direct current voltage drop thereacross. This drop is utilized for controlling the bias on the control electrode of tube 62. Inasmuch as the circuit embodying tube 62 functions exactly in the manner explained above with regard to tube 23 in Fig. 1, it will be understood that decreases in the voltage induced in secondary 52 effect increases in the output current of the triode of tube 62 until in the region of proximate balance, these increases reach their maximum. At balance the reading on milliammeter 67 will be maximum. This indicates that no current flows across the points 20 and 21 of the network. Fig. 5 shows output current changes for various levels of input voltage.

Thus, it is seen that the comparatively insensitive detector 53 offers a wide hunting range in determining the preliminary adjustments that are necessary to bring the network toward balance while the sensitive diode-triode tube 62 facilitates the operation of bringing the network into precise balance.

In most cases it is possible, when the apparatus is originally assembled and initially adjusted, to set the amplifier 60 at a gain which will permit the tube 53 to operate for approximate adjustment and the tube 62 to operate for precise adjustment.

Figure 3:
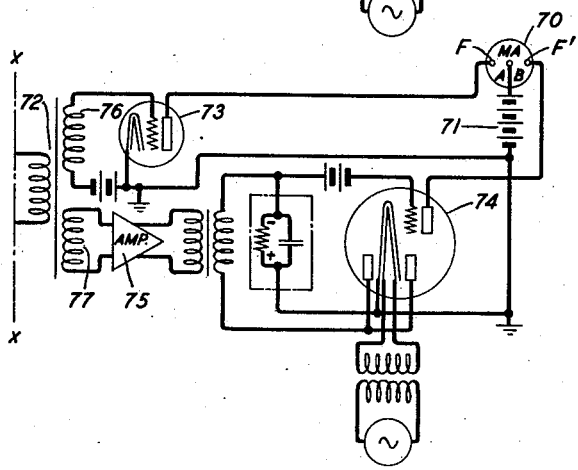

Operation of Fig. 3

In the modification shown in Fig. 3 it is to be understood that the circuit portion shown is to be substituted for the circuit portion to the right of the line x—x in Fig. 1.

Fig. 3 is substantially identical with Fig. 2 except that milliammeters 55 and 67 of the latter are combined in Fig. 3 in a differential milliammeter 70 which may be of a suitable commercial type. This enables a use of a single plate battery 71 connected to a common point of the actuating coils of milliammeter 70. Before commencing a test, the bias on the grid of detector 73 is arranged such that at complete unbalance of the network its output current will produce substantially a reading "F" on the scale A of milliammeter 70. Also, with no input impressed on the primary of transformer 72, the bias on the grid of diode-triode tube 74 is selected such that the output current provides a maximum reading "F'" on scale B of milliammeter 70. This assumes that normal potential is applied to the plates of both tubes. As in Fig. 2, it is understood that the gain of amplifier 75 is set at a level which renders tube 74 ineffective during the useful range of detector 73, and, in addition, renders the tube 74 effective as the detector 73 approaches "0" intermediate readings "F" and "F'". This will be seen more clearly in the following explanation of the operation of Fig. 3.

When the network arranged for a test is considerably off balance, a relatively high level of alternating current voltage is induced in secondaries 76 and 77. Due to the effect of the gain of amplifier 75, the voltage induced in secondary 77 may be disregarded for the moment. However, the voltage induced in secondary 76 causes a current to flow in the output of detector 73 whereby an initial reading is produced on scale A somewhere between "0' and "F'. A manipulation of the variable arm of the network to vary this reading will indicate the adjustments required to bring the network toward balance. Thereafter, the network is adjusted to bring about a decrease in the voltage induced in secondary 76 until a level is reached where the reading on scale A is substantially "0".

At this point the gain of amplifier 75 will be such that the current flowing in the output of tube 74 carries the reading slightly to the right of "0" on scale B. The voltage induced in secondary 77 is now rectified in the diode of tube 74. The resulting direct current is utilized to produce a direct current voltage drop for controlling the bias on the grid of the triode of tube 74. This action is described above in the operations of Figs. 1 and 2.

As the network approaches balance, the level of the voltage induced in secondary 77 will fall, hence the readings on scale B will increase in succeedingly larger amounts until in the region of proximate balance these increases attain their maximum. At balance, the reading "F" on scale B will be reached whereby a condition of no-current flow across points 20 and 21 will be indicated. Thus, scale A offers a hunting range while scale B provides a narrow range of high sensitivity in proximity of balance.

Operation of Fig. 4

Fig. 4 is an arrangement for comparing the electrical characteristics of an unknown apparatus X with those of a standard apparatus S. As in Fig. 1 if the electrical characteristics of unknown apparatus X should entirely consist of capacity or inductance or resistance or a combination thereof, the standard apparatus S should possess similar characteristics in an equal or approximate amount.

As seen in Fig. 4 either standard S or unknown X may be connected between a source 80 of suitable testing frequency and the input of a conventional amplifier 82 by manipulating a pair of D. P. D. T. switches 81, 81. The latter are joined mechanically by an operating handle 83 which serves to actuate both switches simultaneously in the same direction. The output of amplifier 82 is impressed across the primary of a step-up transformer 84 provided with a split secondary. The opposite ends of the secondary are connected to the diodes of tube 85; and the center point of the secondary is connected directly to the central electrode of the triode and also through network 86 and biasing battery 87 to the cathode.

Tube 85 is the diode-triode type referred to in Fig. 1. The triode output includes a milliammeter 88 and plate battery 89. The diode is arranged for full-wave rectification. Network 86 comprises a resistance 90 and a condenser 91 in parallel both of which may be selected for a particular test in accordance with the explanation set forth in connection with Fig. 1.

Preliminary to making a comparison test between standard S and unknown X, the circuit is initially adjusted as follows: With both D. P. D. T. switches in the open position and obviously no input applied to the primary of transformer 84, biasing battery 87 is selected such that the current flowing in the output of the triode produces a full-scale reading on milliammeter 88. This presupposes a normal voltage applied to the plate of the triode.

In operation, the D. P. D. T. switches are thrown upward to connect the standard S in the circuit. Thus, an alternating current voltage is impressed on the primary of transformer 84 through the amplifier 82. The alternating current voltage induced in the secondary is rectified in the diode from which a direct current flow is established through resistance 90 to build up a direct current voltage drop thereacross. Inasmuch as the negative end of the latter is nearest to the central electrode of the triode, this drop augments the bias supplied by battery 87.

As a result the current flow in the triode output is decreased by an amount which will be indicated by the reading on milliammeter 88 with respect to maximum. Condenser 91 smooths out the rectified voltage.

The D. P. D. T. switches are now thrown downward to connect the unknown X in the circuit. As above, the alternating current voltage induced in the secondary of transformer 84 is rectified in the diode to build up a direct current voltage drop across resistance 90. This drop augments the bias supplied by battery 87. Thus, the current flow in the output of the triode is decreased by an amount indicated by the reading on milliammeter 88 with respect to the maximum. The readings effected by the standard S and unknown X are then compared, and, in this way, their electrical characteristics are analyzed.

If preferred, the circuit may be so arranged that with the standard S connected therein the output current produces a reading exactly on the mid-point of milliammeter 88. Then, when the unknown X is substituted for the standard S, the output current will effect a reading which will either coincide with, or fall to the right or left of the mid-point. Thus, it will be immediately evident whether the unknown X possesses the required electrical characteristics within allowable limits.

It will be noted that biasing battery 87 utilized to determine the output in the preliminary adjustment also places the cathode at a fixed positive potential with respect to the diodes. This provides a biasing voltage which is impressed on the diodes thereby precluding the development of a direct current voltage across resistance 90 until the peaks of the voltages induced in the secondary of transformer 84 exceed the biasing voltage. This arrangement is advantageous since the difference between the peak voltages produced by the standard S and unknown X may be used to effect a relatively large difference in the readings on milliammeter 88.

It is evident from the above description that by a proper selection of impedance and capacity, both of which are utilized for controlling the bias on the control electrode of the detector, the circuits may be arranged for operation with input voltages which vary logarithmically. In such case, it will be understood that variations in steps of one decibel in the level of the input voltage will produce changes in the output current that are the same for each decibel, and, consequently, correspondingly equal deflections on the scale of the indicating meter. In other words, as the input voltage varies logarithmically the output current changes linearly. For this operation, the output indicator would be calibrated in decibels.

While the invention is explained in connection with a multiple-function tube of the diode-triode type, it is obvious that individual rectifiers and triodes, or similar apparatus suitable for the same purposes, may be substituted therefor. Moreover, the invention is not necessarily restricted to uses including a multi-arm network, and may also be expeditiously utilized otherwise, depending on the circuit whose electrical characteristics it is desired to measure or analyze.

What is claimed is:

1. In a system for measuring the magnitude of an electrical quantity, the combination comprising means for rectifying such quantity, a thermionic amplifier including a control grid and having its input connected to the output of the rectifying means, indicating means in the amplifier output, means for so biasing the control grid at no input that the amplifier output is such as to produce a maximum reading on the indicating means, and means connected in the output of the rectifying means and responsive to rectified current for variably augmenting the grid biasing means to vary the amplifier output such that the indicating means is actuated in a direction toward the maximum reading for a diminishing electrical quantity and in a direction away from the maximum reading for an increasing electrical quantity.

2. The system according to claim 1 in which the electrical quantity to be measured changes linearly, and the last-mentioned means is a network comprising a resistance and a condenser in parallel, both of which are so proportioned that the amplifier output is varied logarithmically.

3. In a system for measuring alternating voltage magnitudes, the combination comprising means for rectifying such voltage, a thermionic amplifier including a control grid and having its input connected to the output of the rectifying means, indicating means in the amplifier output, means for so biasing the control grid at no input that the amplifier output is such as to produce a maximum reading on the indicating means and also for so biasing the rectifying means that rectification is blocked until the peaks of the alternating voltage exceed the magnitude of the biasing means associated with the rectifying means, and means comprising a capacity and resistance in parallel and responsive to rectified current for effecting a voltage that augments the grid biasing means to varyingly decrease the amplifier output so as to produce on the indicating means readings that are varyingly less than the maximum reading depending on peaks of the alternating voltage.

4. In a system for comparing the magnitudes of electrical quantities of discrete electrical apparatus, the combination comprising an apparatus having an electrical quantity of predetermined magnitude, an apparatus having an electrical quantity of unknown magnitude, which magnitude is to be indicated relative to the predetermined magnitude, a source of alternating voltage, rectifying means, switching means having the source and the rectifying means connected to the opposite ends thereof for alternately applying the source and rectifying means to the opposite ends of both apparatus, a thermionic amplifier including a grid and connected to the output of the rectifying means, indicating means in the amplifier output, means for so biasing the grid at no input that the amplifier output is such as to produce a maximum reading on the indicating means and also for so biasing the rectifying means that only a peak voltage in excess of a predetermined magnitude is rectified, and means comprising a capacity and resistance in parallel and responsive to rectified current for effecting a voltage that augments the grid biasing means to produce on the indicating means readings less than the maximum reading by amounts that depend on the magnitude of the peaks of the alternating voltage, the switching means being initially actuated to connect between the source and the rectifying means the apparatus whose electrical quantity has a predetermined magnitude so that the rectified peak voltage produces rectified current that cooperates with the responsive means to so augment the biasing means to vary the amplifier output as to produce on the indicating means a predetermined reading which is less than the maximum reading and the switching means being thereafter actuated to connect between the source and the rectifying means the apparatus whose electrical quantity has an unknown magnitude so that the rectified peak voltage produces rectified current that cooperates with the responsive means to so augment the biasing means to vary the amplifier output as to produce on the indicating means a second reading less than the maximum reading, the second reading when compared with the predetermined reading indicating the relation between the magnitudes of the electrical quantities of both.

5. In a circuit for indicating alternating voltage magnitudes, the combination comprising a source of alternating voltage, a transformer having a primary winding and two secondary windings, the source of alternating voltage being applied to the primary winding, a detector tube applied to one secondary winding, rectifying means applied to the other secondary winding, a thermionic amplifier including a grid and having its input connected to the output of the rectifying means, differential indicating means having two scales and arranged in the outputs of the detector and amplifier so that the one scale in the output of the detector is responsive to one range of alternating voltage and the second scale in the output of the amplifier is responsive to another range of alternating voltage, means for so biasing the grid of the detector at no input that the output thereof is such as to produce a maximum reading in one direction on the one scale, the one range of alternating voltage varying the output of the detector such that readings in a direction toward the maximum reading are produced on the one scale as the one range of alternating voltage is increasing and readings in a direction away from maximum reading are produced on the one scale as the one range of alternating voltage is decreasing, means for so biasing the grid of the amplifier at no input that the output thereof is such as to produce a maximum reading in an opposite direction on the second scale, and means comprising a capacity and resistance in parallel and connected in the output of the rectifying means and responsive to rectified current due to the other range of alternating voltage for variably augmenting the grid biasing means associated with the amplifier to vary the output thereof such that readings in a direction toward the maximum reading are produced on the second scale as the other range of alternating voltage is decreasing and readings in a direction away from the maximum are produced on the second scale as the other range of alternating voltage is increasing.

6. In a system for indicating the magnitude of an electrical quantity, the combination comprising a Wheatstone bridge comprising two arms having fixed electrical quantities, an adjustable arm having a variable known electrical quantity, an arm having an unknown electrical quantity, and a source of alternating current connected to one diagonal of the bridge, the arm having the variable known electrical quantity being adjusted to produce unbalance alternating voltage at the other diagonal of the bridge until a condition of balance between the arms having the variable known and unknown electrical quantities is attained, whereupon no unbalance voltage is produced thereat; means for indicating both the magnitude of the unbalance voltage and a condition of balance between the arms having the variable known and unknown electrical quantities comprising means connected to the opposite diagonal of the bridge for rectifying the unbalance voltage, a thermionic amplifier having a control grid and its input being connected to the output of the rectifying means, indicating means in the output of the amplifier, means for so biasing the control grid at no input that the amplifier output is such as to actuate the indicating means to a maximum reading, and means connected in the output of the rectifying means and responsive to rectified current for producing a voltage that variably augments the grid biasing means to vary the amplifier output such that the indicating means is actuated in a direction toward the maximum reading as the arm having the variable known electrical quantity is being adjusted toward balance with the arm having the unknown electrical quantity and is actuated in a direction away from the maximum reading as the arm having the variable electrical quantity is being adjusted away from balance with the arm having the unknown electrical quantity, the maximum amplifier output and thereby the maximum reading on the indicating means showing when the arms having the variable known and unknown electrical quantities attain a condition of balance.

7. The system according to claim 6 in which the unbalance alternating voltage changes logarithmically, and the responsive means is a network comprising a resistance and condenser connected in parallel, and the network is so proportioned that the amplifier output is varied linearly.

8. In a system for indicating alternating voltage magnitudes, the combination comprising a source of alternating voltage, a transformer having a primary winding and two secondary windings, the source being applied across the primary winding, a detector tube connected to one secondary winding, indicating means in the output of the detector to be responsive to one range of alternating voltage, means for so biasing the grid of the detector at no input that the output thereof is such as to produce substantially maximum reading on the indicating means associated therewith, the one range of alternating voltage varying the output of the detector such that readings in a direction toward the maximum reading are produced for an increasing alternating voltage and readings in a direction away from the maximum reading are produced for a decreasing alternating voltage, rectifying means applied across the other secondary winding, a thermionic amplifier including a grid and having its input connected to the output of the rectifying means, indicating means in the output of the amplifier to be responsive to another range of alternating voltage, means for so biasing the grid of the amplifier at no input that the output thereof is such as to produce a maximum reading on the indicating means associated therewith, and means comprising a capacity and resistance in parallel and connected in the output of the rectifying means and responsive to rectified current due to the other range of alternating voltage for variably augmenting the grid biasing means associated with the amplifier to vary the output thereof such that readings in a direction toward the maximum reading are produced for a diminishing alternating voltage and readings in a direction away from the maximum reading are produced for an increasing alternating voltage.

9. In a system for indicating the magnitude of an electrical quantity, the combination comprising a Wheatstone bridge comprising two arms having fixed electrical quantities, an adjustable arm having a variable known electrical quantity, an arm having an unknown electrical quantity, and a source of alternating current connected to one diagonal of the bridge, the arm having the variable known electrical quantity being adjusted to produce unbalance alternating voltage at the other diagonal of the bridge, until balance between the arms having the variable known and unknown electrical quantities is attained, whereupon no unbalance voltage is produced thereat; means for both indicating unbalance voltage and a condition of balance between the arms having the variable known and unknown electrical quantities comprising a transformer having a primary winding and two secondary windings, the primary winding being applied to the other diagonal of the bridge, a detector tube having its input connected across one secondary winding, indicating means in the output of the detector to be responsive to one range of alternating voltage, means for so biasing the grid of the detector at no input that the output thereof is such as to produce substantially maximum reading on the indicating means associated therewith, the one range of alternating voltage varying the output of the detector such that the indicating means in the output thereof is varied in a direction toward the maximum reading as the arm having the variable known electrical quantity is being adjusted away from balance with the arm having the unknown electrical quantity and is varied in a direction away from the maximum reading as the arm having the variable known electrical quantity is being adjusted toward balance with the arm having the unknown electrical quantity, a multiple function tube comprising a diode rectifier and a triode amplifier so connected that the diode is applied to the other secondary winding and the input of the triode is applied to the output of the diode, indicating means in the output of the triode to be responsive to another range of alternating voltage, means for so biasing the grid of the triode at no input that the output thereof is such as to produce a miximum reading on the indicating means associated therewith, and means comprising a capacity and resistance in parallel and interposed in the output of the diode and responsive to rectified current due to the other range of alternating voltage for variably augmenting the grid biasing means associated with the triode to vary the output thereof such that the indicating means associated therewith is varied in a direction toward the maximum reading as the arm having the variable known electrical quantity is being adjusted toward balance with the arm having the unknown electrical quantity and is varied in a direction away from the maximum reading as the arm having the variable known electrical quantity is being adjusted in a direction away from balance with the arm having the unknown electrical quantity, the maximum triode output and thereby the maximum reading on the indicating means showing when a balanced condition between the arms having the variable known and unknown electrical quantities is attained.

10. In a system for indicating the magnitude of an electrical quantity, the combination comprising a Wheatstone bridge comprising two arms having fixed electrical quantities, an adjustable arm having a variable known electrical quantity, an arm having an unknown electrical quantity, and a source of alternating voltage connected to one diagonal of the bridge, the arm having the variable known electrical quantity being adjusted to produce unbalance alternating voltage at the other diagonal of the bridge until balance between the arms having the variable known and unknown electrical quantities is attained, whereupon no unbalance voltage is produced thereat; means for both indicating the magnitude of the unbalance voltage and a condition of balance between the arms having the variable known and unknown electrical quantities comprising a transformer having a primary winding and two secondary windings, the primary winding being applied to the other diagonal of the bridge, a detector tube having its input connected across one secondary winding, a multiple function tube comprising a diode rectifier and triode amplifier so connected that the diode is applied across the other secondary winding and the input of the triode is applied across the output of the diode, differential indicating means having two scales and connected in the outputs of the detector and the triode, one scale being responsive to one range of unbalance voltage and the other scale being responsive to another range of unbalance voltage, means for so biasing the grid of the detector at no input that the output thereof is such as to produce a maximum reading in one direction on the one scale, the one range of alternating voltage varying the output of the detector such that the one scale produces readings in a direction toward the maximum reading as the arm having the variable known electrical quantity is being adjusted away from balance with the arm having the unknown electrical quantity and produces readings in a direction away from the maximum reading as the arm having the variable known electrical quantity is being adjusted toward balance with the arm having the unknown electrical quantity, means for so biasing the grid of the triode at no input that the output thereof is such as to produce a maximum reading in an opposite direction on the other scale, and means comprising a capacity and resistance in parallel connected in the output of the diode and responsive to rectified current due to the other range of alternating voltage for variably augmenting the grid biasing means associated with the triode to vary the triode output such that the other scale produces readings in a direction toward the maximum reading as the arm having the variable known electrical quantity is being adjusted toward balance with the arm having the unknown electrical quantity and produces readings in a direction away from the maximum reading as the arm having the variable known electrical quantity is being adjusted away from balance with the arm having the unknown electrical quantity, the maximum triode output and thereby the maximum reading on the indicating means showing when a balanced condition between the arms having the variable known and unknown electrical quantities is attained.

WILLIAM B. BOHANNON.